April 24, 1934.  G. F. WALES  1,955,866
METHOD AND APPARATUS FOR PERFORATING SHEET MATERIAL Filed Feb. 4, 1932  6 Sheets-Sheet 1

INVENTOR.
George F. Wales
BY
Popp + Powers
ATTORNEYS.

April 24, 1934. G. F. WALES 1,955,866
METHOD AND APPARATUS FOR PERFORATING SHEET MATERIAL
Filed Feb. 4, 1932   6 Sheets-Sheet 2
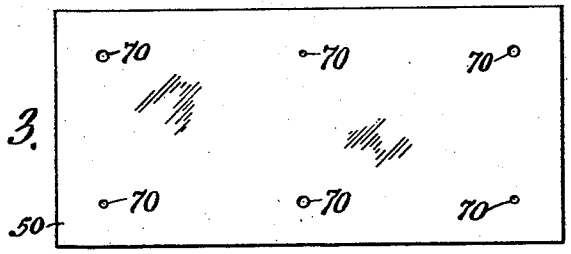
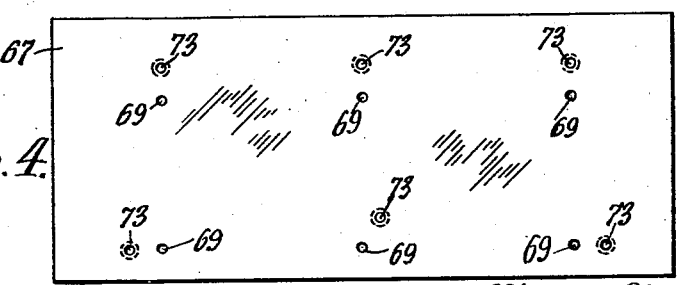
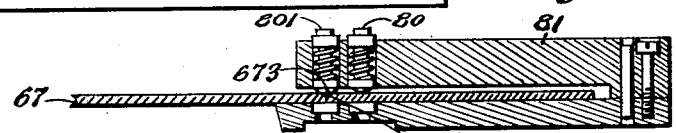
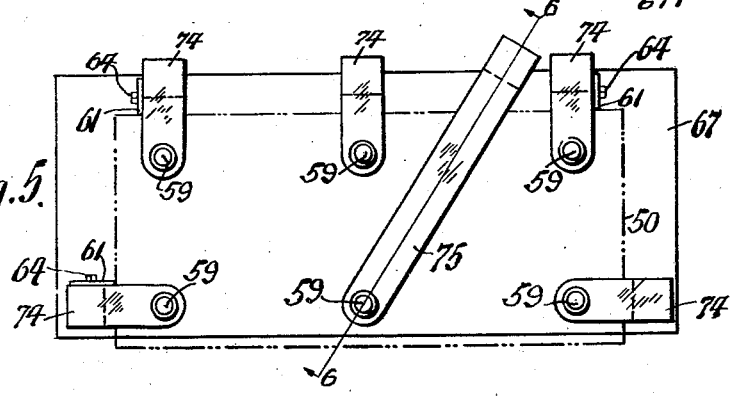
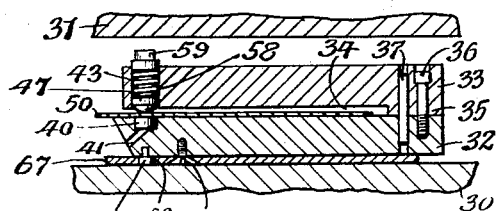
INVENTOR
George F. Wales
BY
Pope & Powers
ATTORNEYS April 24, 1934. G. F. WALES 1,955,866
METHOD AND APPARATUS FOR PERFORATING SHEET MATERIAL
Filed Feb. 4, 1932 6 Sheets-Sheet 3
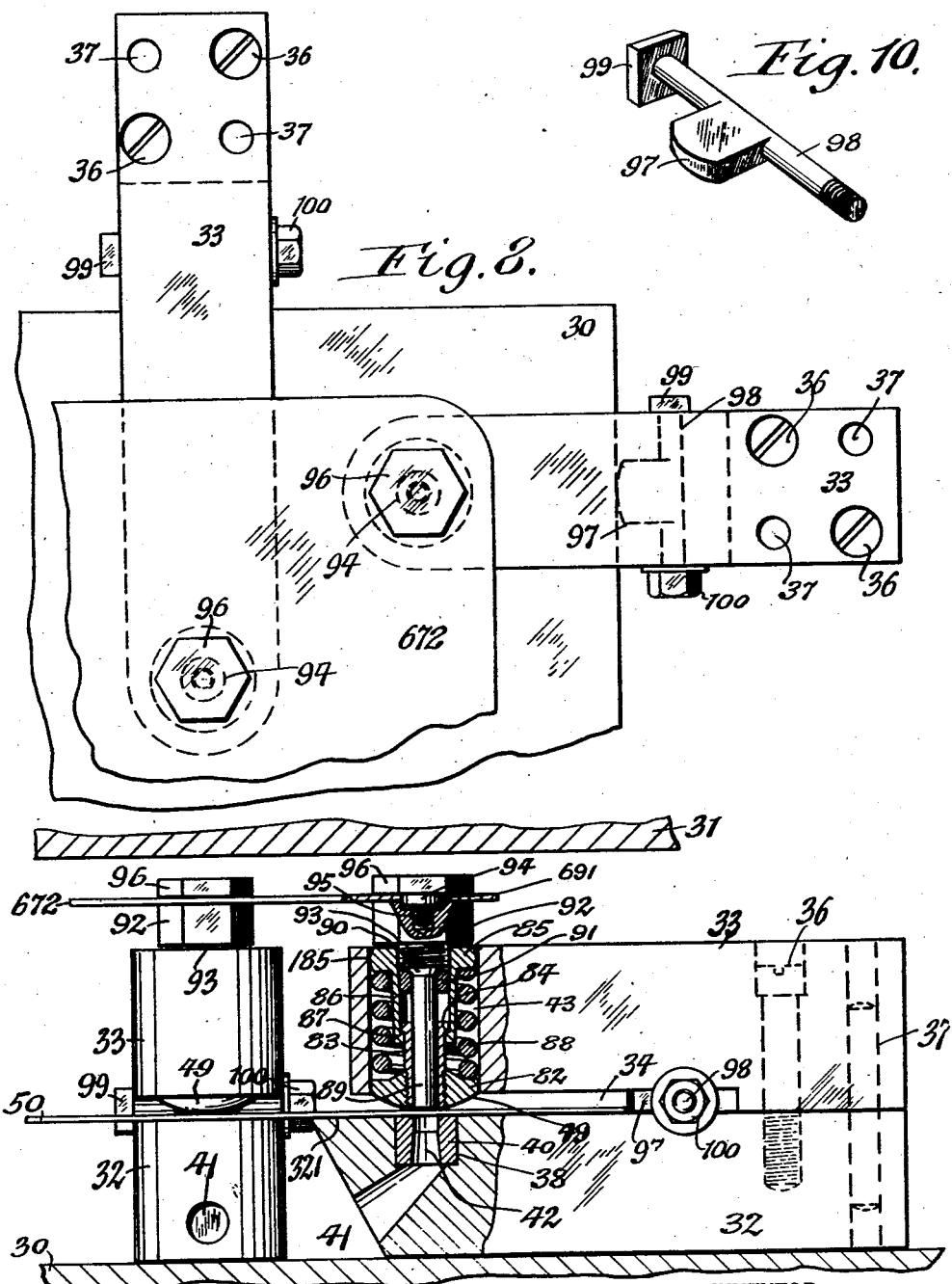

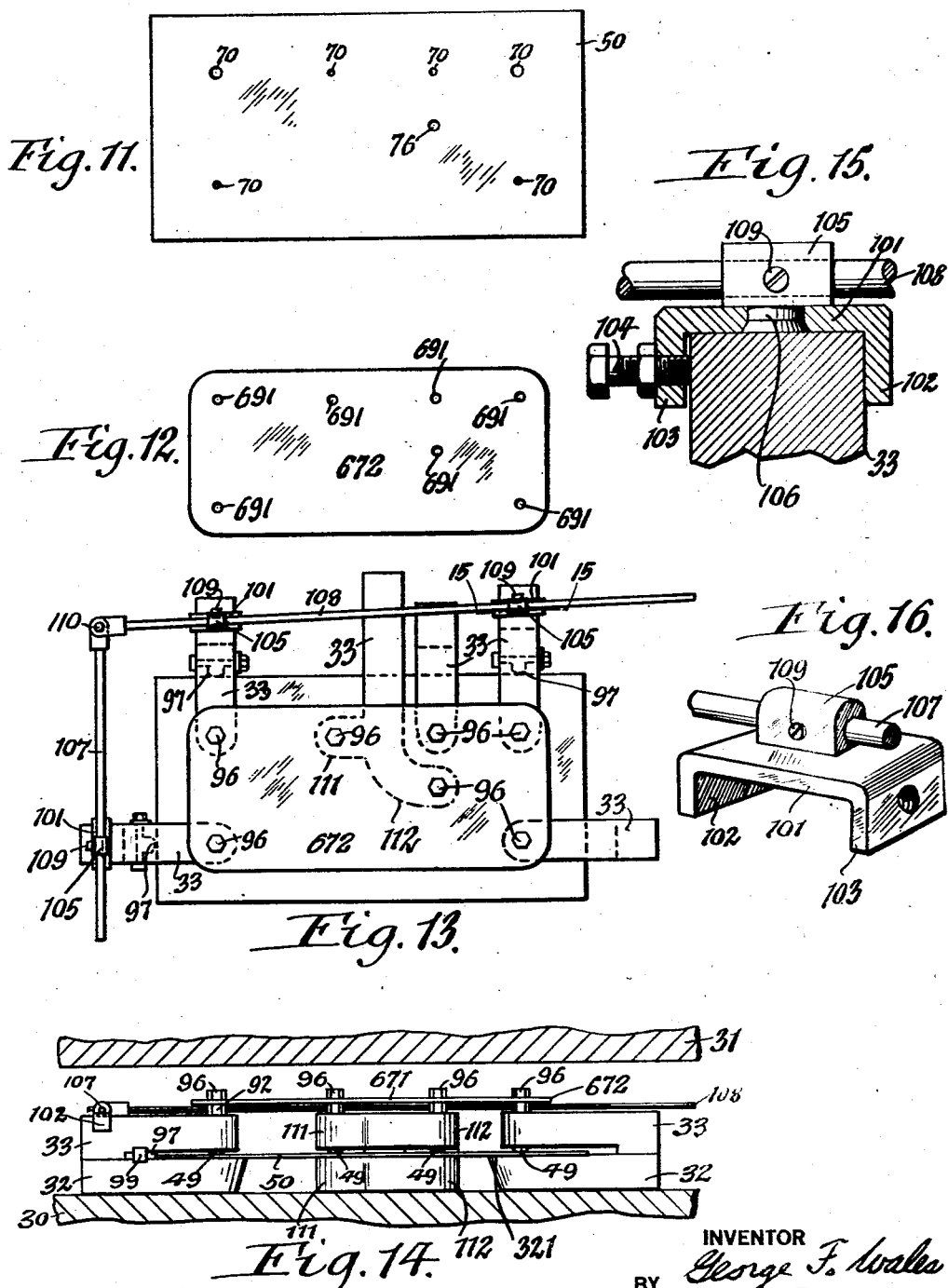

April 24, 1934.  G. F. WALES  1,955,866
METHOD AND APPARATUS FOR PERFORATING SHEET MATERIAL
Filed Feb. 4, 1932  6 Sheets-Sheet 5

INVENTOR.
George F. Wales
BY Popp & Powers
ATTORNEYS.

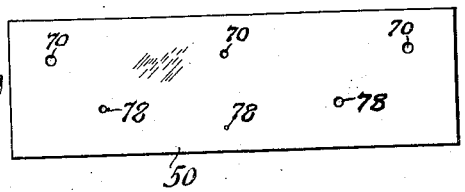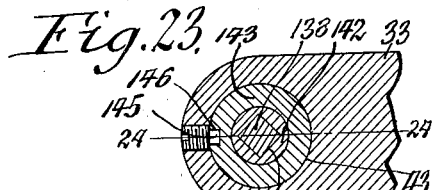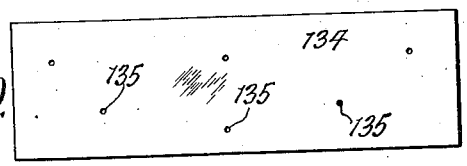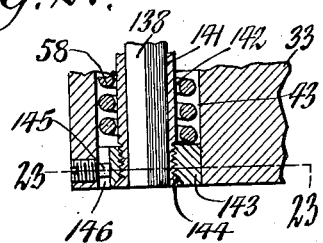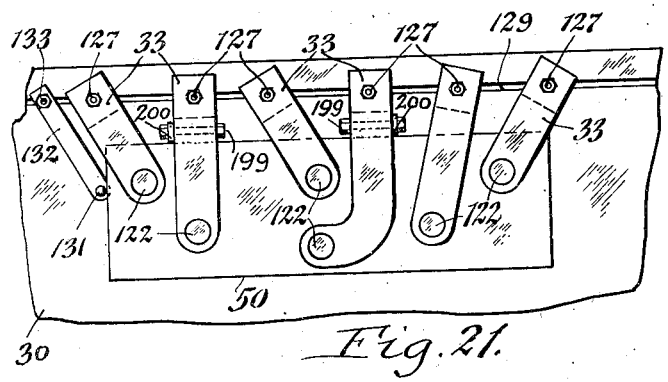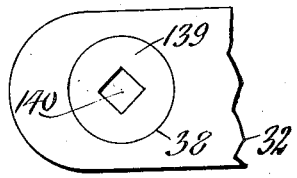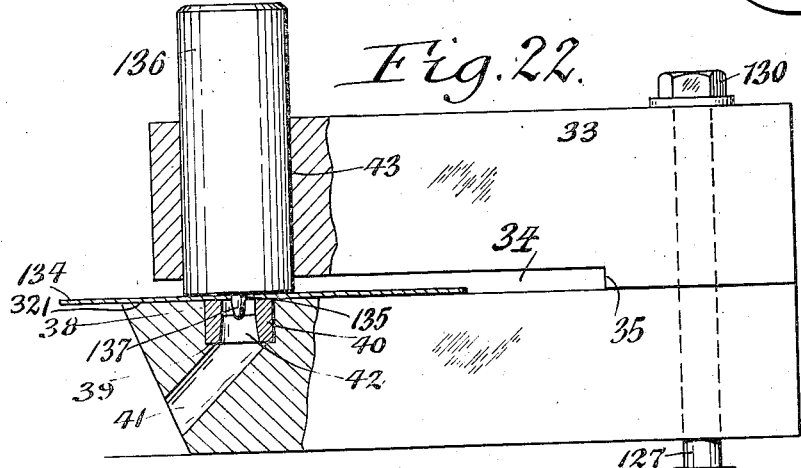

Patented Apr. 24, 1934

1,955,866

UNITED STATES PATENT OFFICE 1,955,866

METHOD AND APPARATUS FOR PERFORATING SHEET MATERIAL

George F. Wales, Buffalo, N. Y.

Application February 4, 1932, Serial No. 590,817

21 Claims. (Cl. 164—118)

This invention relates to an apparatus for perforating comparatively thin sheet metal and similar materials and more particularly to an apparatus for this purpose which is to be used in conjunction with an ordinary press having a lower supporting bed and an upper ram which is movable vertically toward and from the bed.

Although a large quantity of sheet metal is constantly being perforated for use in fabricating various commodities in different industries it is well known that very few, if any, sheets which have been perforated to suit one commodity will have the holes properly located so that the same can be used for making another article.

Heretofore various means have been employed for punching holes in the required places in sheets of metal or the like but all of them comprise dies rigidly mounted on the stationary bed of a press and a punch cooperating with the die and mounted on a ram which moves vertically toward and from the bed.

When only a small quantity of metal sheets were to be perforated with holes located in the same place on each sheet it has usually been the custom to punch one hole at a time in each sheet and then shift the position of the die and punch for producing holes in a different location in the sheet and also changing the size of the die and punch to suit the variation in the size of the holes if this was necessary. For example, if a sheet required five ⅜ inch holes, two $\frac{5}{16}$ inch holes and one ¼ inch hole, a ⅜ inch die and punch are first mounted in the press for punching all the ⅜ inch holes in the required number of sheets, then a $\frac{5}{16}$ inch die and punch were used to punch the $\frac{5}{16}$ inch holes in the several sheets, and then the ¼ inch die and punch were used for producing the ¼ inch holes.

If the quantity of sheets to be perforated was large enough to warrant the expenditure, a multiple die and punch was made for this particular job, the die shoe or base of the holder carrying all the dies in their proper relative position and the overhanging head or horn of the holder carrying the corresponding punches in the required relative position.

Each sheet of the large quantity to be perforated was placed over the several dies and during the descent of the punches all of the holes were punched simultaneously in the sheet.

In some instances greater flexibility was provided by mounting the dies on the bed of the press so that the same were slidable lengthwise thereon and capable of being clamped in the desired position and the punches were similarly mounted on the ram of the press. Such an organization however permitted of only punching holes in different parts of sheets along a straight line and was incapable of punching holes which were distributed promiscuously over the same.

The chief purpose of this invention is to provide an economical and inexpensive sheet material perforating apparatus which is so organized that the same can be adjusted to punch all the holes of the same or different sizes in the sheets regardless of whether the quantity is large or small and thus effect a substantial saving over the method in which the holes were punched one at a time in the sheets as well as the method of making multiple dies and punches for use in perforating a large quantity of sheets.

Another feature of this invention is to provide a plurality of die and punch assemblages which can be readily and easily shifted and interchanged for punching holes of the same or different sizes in various locations on the same or different sheets.

Another object of this invention is to so organize the die and punch means that the same can be used in the standard punch presses and machines now in general use for perforating sheet materials.

A further object of this invention is to provide the die and punch elements with simple and efficient means for stripping the work which are less expensive than the methods heretofore employed for this purpose.

A still further object of this invention is to provide means for locating the die and punch assemblages or units by means of templets so that the assemblages can be set in the various positions required to punch holes accurately in the parts.

The invention has the further purpose of providing simple means for making the templets above described.

It is a further object of this invention to provide improved gaging means whereby the sheets may be properly and quickly located relative to the several dies to insure punching of holes therein in their proper relative position to the edges of the sheets and to other holes which may be already present in the sheet.

A detail of this invention is to so organize the perforating assemblage that the members of the holder carrying the die and punch are rigidly connected and the punching and stripping device is independent of said holder and capable of being readily guided thereon and also removed therefrom and the punching element may be driven through the work piece and stripped therefrom without liability of distorting the part of the holder in which the punch is guided.

Another object of this invention is to so construct the punching and stripping device that the same will be automatically lifted when the work is fed underneath the same preparatory to effecting the punching operation.

A still further object of this invention is to so organize the punching and stripping mechanism that the punch proper can be quickly and conveniently changed from one size to another or to replace a broken punch in case of an accident.

In the accompanying drawings:

Figure 3 is a plan view of a sheet of material having different sizes of holes located in different parts thereof and representing an example of the product capable of being made by the apparatus embodying this invention.

Figure 4 is a plan view of the templet adapted to be associated with the punch and die assemblages of my invention for producing the perforated plate shown in Fig. 3.

Figure 5 is a top plan view of a plurality of punch and die assemblages associated with the templet shown in Fig. 4, for the purpose of producing the perforated sheet shown in Fig. 3.

Figure 6 is a vertical section taken on line 6—6 Fig. 5.

Figure 7 is a vertical section showing a form of device suitable for punching a templet sheet for locating the places where the same is to receive the punching devices.

Figure 8 is a fragmentary top plan view, similar to Fig. 1, showing the modified form of the perforating device, the gage for locating the work piece and the templet for locating and holding the perforating device in their proper relative position.

Figure 9 is a side elevation, partly in section, of the organization shown in Fig. 8.

Figure 10 is a perspective view of the gage or stop used in connection with the device shown in Figs. 8 and 9.

Figure 11 is a plan view of a sheet of material having perforations of different sizes and locations as compared with that shown in Fig. 3.

Figure 12 is a top plan view of the templet shown in the modified form of my invention which is represented in Fig. 13.

Figure 13 is a top plan view of a plurality of die and punch holders of the character shown in Figs. 8, 9 and 10 which have their punches and dies located in their proper relative position by a templet similar to that shown in Figs. 8 and 9 but are also held in the proper position by means of a retaining device so that the gages or stops on these holders will serve as means for properly locating the work piece of sheet metal which is to be perforated.

Figure 14 is a side elevation of the parts shown in Fig. 13 arranged between the bed and ram of a punch press.

Figure 15 is a fragmentary vertical section, on an enlarged scale, taken on line 15—15 Fig. 13.

Figure 16 is a fragmentary perspective view of the retaining means shown in Figs. 13 and 14 for retaining the punch and die holders in their proper relative position.

Figure 17:
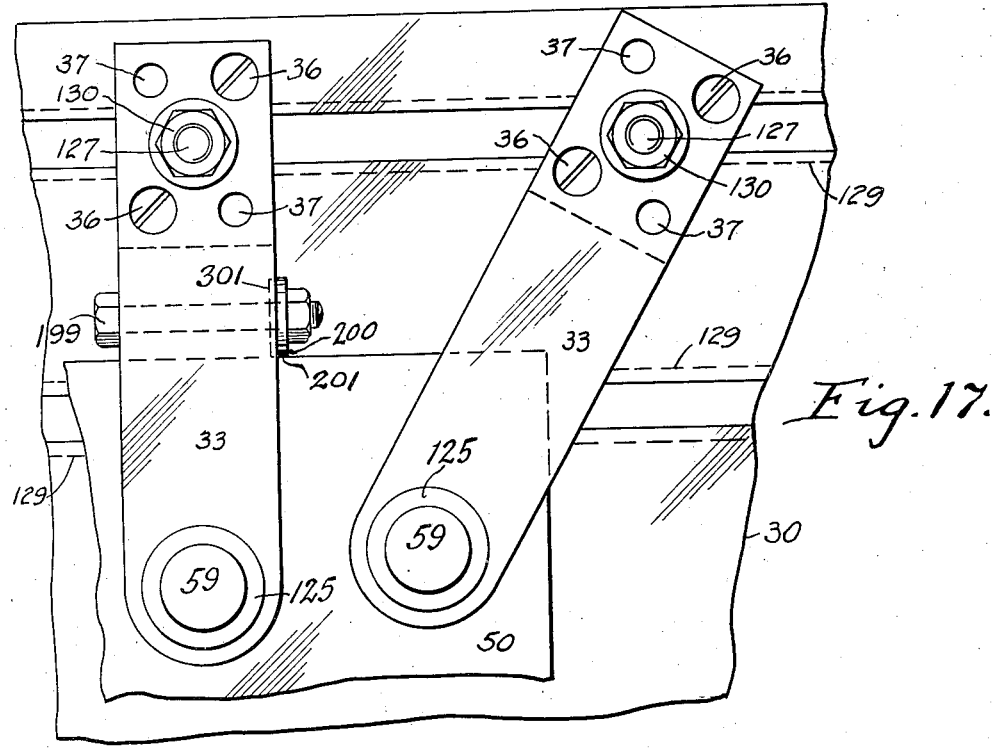

Figure 17 is a fragmentary top plan view showing another modified form of my invention so far as the punching units or assemblages are concerned, also modified means for adjustably mounting the punch and die units or assemblages on the bed of a punch press or machine, and also a modified form of the gaging means.

Figure 18:
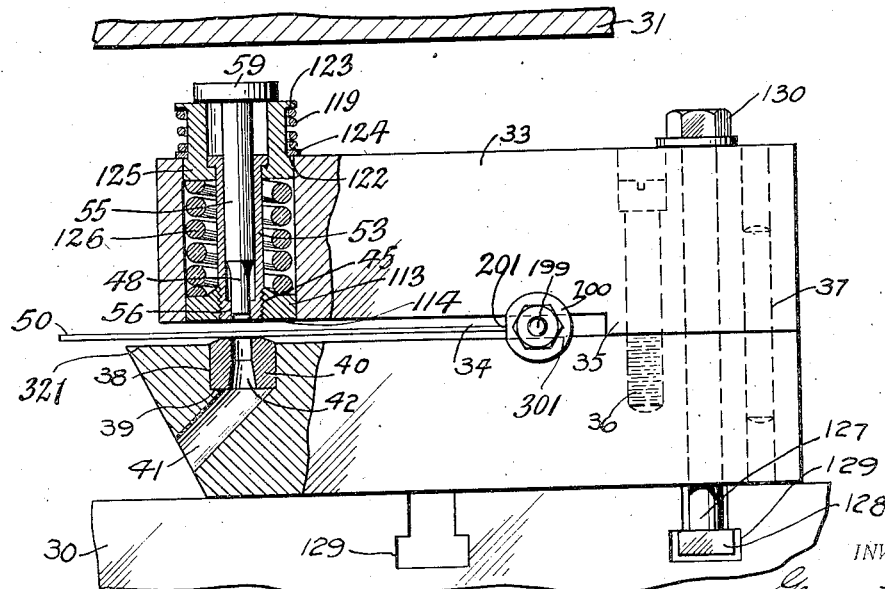

Figure 18 is a fragmentary side elevation, partly in section, of the punch and die assemblage shown in Fig. 17.

Figure 19 is a top plan view of another form of sheet metal work piece having holes of different sizes capable of being produced advantageously by an apparatus embodying my invention.

Figure 20 is a plan view of the templet utilized for locating the punch and die assemblages for producing the product shown in Fig. 19.

Figure 21 is a fragmentary plan view of the bed of a press showing a plurality of punch and die assemblages embodying my invention and mounted on the bed or bolster of the press in the proper position for producing the perforated sheet shown in Fig. 19, this view also showing a modified form of the gage or stop for locating the work piece preparatory to perforating the same.

Figure 22 is a side view, partly in section, showing a modified form of the means for locating the punch and die assemblages by means of a templet in accordance with this invention preparatory to utilizing the punching units or perforating sheets of metal or the like in accordance with the templet shown in Fig. 20.

Figure 23 is a horizontal section taken on line 23—23 Fig. 24 showing a modified form of the punch and the means for guiding the same.

Figure 24 is a vertical section taken on line 24—24 Fig. 23.

Figure 25 is a plan view of the die which cooperates with the punch shown in Figs. 23 and 24 and the support of this die.

In the following description similar characters of reference indicate like parts in the several figures of the drawings.

This perforating apparatus is adapted to be used in connection with any well-known or standard punch press or similar machine now on the market which includes among other elements a lower supporting bed 30 which is mounted on the lower part of the stationary main frame of the press and an upper ram 31 which is guided upon the upper part of this main frame and movable vertically toward and from the bed.

In the space between this bed and ram of the press the perforating apparatus embodying my improvements is arranged and adapted to be operated by the movement of the ram toward the bed for the purpose of punching holes in the sheets of material which are fed to the perforating mechanism.

The different features of my improved perforating mechanism may be variously constructed and still embody the underlying principle of the invention and several examples of such devices are disclosed herein.

Figure 1:
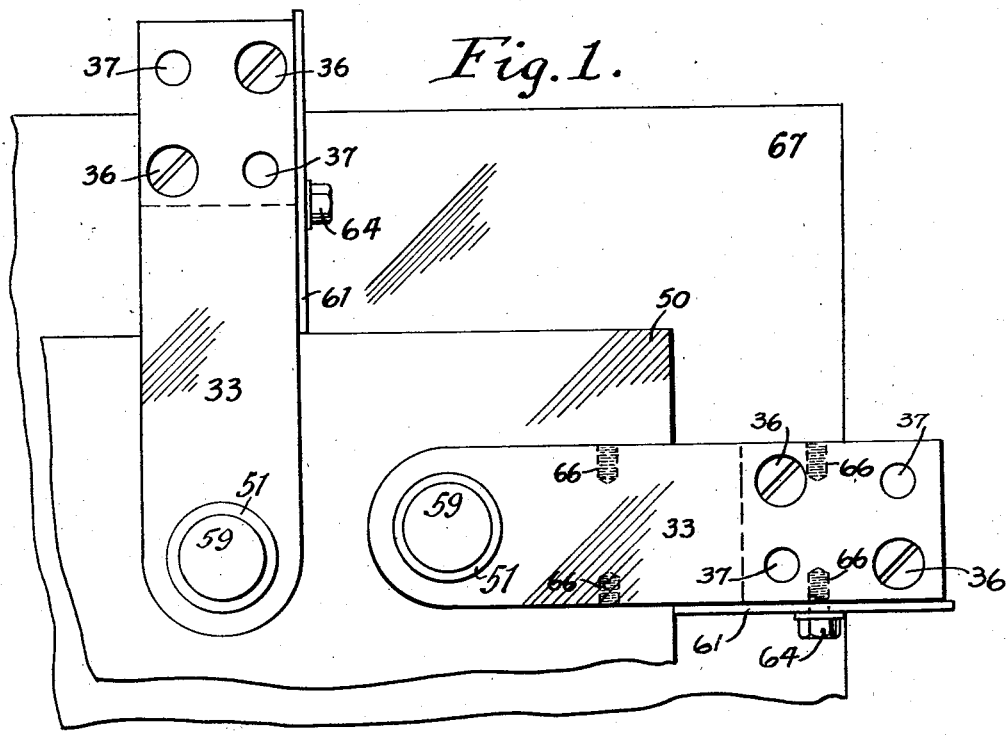
Figure 1 is a fragmentary plan view of one corner of the bed of a punching press showing two of the punch and die assemblages together with a templet mounted thereon in accordance with one form of this invention and showing the work piece engaged with gages or stops on these assemblages ready to be perforated.
Figure 2:
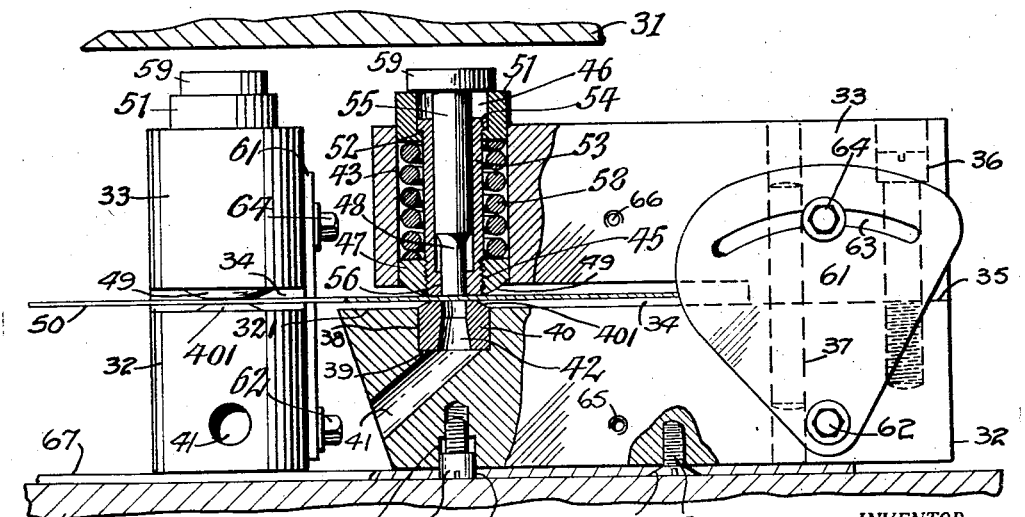
Figure 2 is a fragmentary side elevation of the same, partly in section, showing two punch and die assemblages in position between the bed and ram of a punch press, preparatory to perforating a sheet of material interposed between the dies and punches of these assemblages.

The particular organization of my invention which is shown in Figs. 1 to 6 is constructed as follows:

The numerals 32 represent the lower base or shoe and 33 the upper head or horn which form the main parts of a holder whereby the operating parts of the perforating device of my invention are supported. This base and head are stationary while in use and are separated at their inner opposing ends by an intervening gap 34 while their outer ends are held apart from each other by means consisting preferably of a foot 35 formed on the under side of the outer part of the head 33 and resting against the outer part of the upper side of the base 32, as shown in Figs. 2 and 6. These two members of the holder are preferably detachably connected with each other and held against relative movement in a horizontal direction by means of screws 36 passing downwardly through the head 33 into the base 32 and also by means of vertical dowels 37 engaging with corresponding openings in the outer parts of the base 32 and head 33, as shown in Figs. 1, 2 and 6.

In the inner part of the upper side of the base 32 the same is provided with an upwardly opening seat or socket 38 which is preferably of cylindrical form and terminates at its lower end in a shoulder 39 and in this seat is arranged a perforating die 40 which rests at its lower end on the shoulder 39 and has its upper end preferably projecting slightly above the upper side of the base 32 and tapering upwardly as shown at 401 in Fig. 2. In the lower part of the inner end of the base the same is provided with a discharge chute or passage 41 which opens at its upper end into the bottom of the seat 38 so as to communicate with the lower end of the die opening 42 while the lower end of the chute 41 extends at an angle inwardly and terminates at the inner end of the base, as shown in Figs. 2 and 6 so that any punchings which are removed from the sheet material downwardly into the opening 40 of the die and discharged from the lower end of the latter are received by this discharge chute and delivered upon the upper side of the bed or table 30 where they may be removed in any desired manner.

By extending the die above the base of the holder the die may be sharpened at the top when the same becomes worn dull.

The inner part of the head 33 of the holder is provided with a vertical guideway 43 of circular form which is axially in line with the opening 42 of the die 40. Within this guide opening 43 is arranged a punching unit which is so organized that the same is capable of sliding vertically in this opening toward and from the die 40 and adapting the same to the upper surface of the sheet of material which is being punched, and also to permit of driving the punching element downwardly through the sheet metal and into the die, and also to enable this punching device to be removed as a unit from the head of the holder and replaced by one having a different size of punching element. The particular organization of this punching device, as shown in Figs. 1 and 2, is constructed as follows.

The numeral 47 represents a lower bearing disk arranged in the lower part of the guide opening 43 and provided on its underside with a rounded face 49 which is adapted to rest on the upper end of the die 40 when the punching apparatus is not in use but which is adapted to be engaged by the upper surface of the work piece 50 of sheet metal or other thin sheet material which is to be operated upon by the punching mechanism for producing holes therein. Within the upper part of the guide opening 43 is arranged an abutment disk 51 which is provided with a central opening 46 and an upwardly facing internal shoulder 52. Projecting downwardly through the central opening 46 of the abutment disk is a tubular guide neck 53 which is provided at its upper end with a downwardly facing external shoulder 54 engaging with the shoulder 52 of the abutment disk while its lower end is secured in a central opening in the bearing disk 47 by a screw joint 45.

Within the tubular neck is arranged the punch which has an upper cylindrical body 55 guided to slide vertically therein and the lower end 48 of which forming the bit may, in the smaller sizes of punches, be reduced in diameter and pass through a reduced guide opening 56 in the lower end of the neck while the upper end of the punch has an enlarged head or anvil 59 bearing against the upper side of the abutment disk 51. Arranged within the guide opening 43 and surrounding the tubular neck 53 and the punch is a helical spring 58 which bears with its lower end against the upper side of the bearing disk 47, while its upper end bears against the underside of the abutment disk 51.

This spring between the bearing and abutment disks tends to keep these disks separated and also serves to withdraw or strip the punch from the work piece after a hole has been punched into the same, as will presently appear. The movement of the bearing and abutment disk away from each other is limited by engagement of the shoulders 52 and 54 of the abutment disk and guide neck.

This punching unit is capable of floating readily within the guide opening 43 in the upper head or member 33 of the holder and when the press is not in operation the lower rounded end 49 of the bearing disk 47 rests on the upper side of the die 40.

Upon pushing or feeding a sheet 50 of metal or other material constituting the work piece into the gap 34 of the punch and die holder preparatory to being perforated, the engagement of this sheet with the rounded lower end 49 of the bearing disk operates to lift the latter together with the other elements of the punching unit due to the stiffness of the spring 58. After the work sheet 50 has been properly placed between the die and punch of the perforating mechanism the ram 31 of the press descends with a working stroke and by engaging with the upper end of the anvil 59 causes the punch to be pushed downwardly so that its lower end punches a hole through that part of the sheet immediately below the lower bearing disk 47, and forces the same through the opening 42 in the die, from which latter the material is delivered by the chute 41 to the exterior of the die and punch holder.

When assembling the various elements associated with the punch unit the spring 58 is placed under an initial compression or tension so as to enable the same, together with the added compression which is imparted thereto during the punching operation, to effectively withdraw the punch from the opening which the same has formed in the sheet material and thereby strip the latter from the punch.

During the punching operation the punch and the abutment disk descend independently of the bearing disk 47 and guide neck 53 and at this time the spring 58 is compressed to a greater extent than that which was initially imparted to the same when assembling the several parts of the punching device preparatory to using the same in the press.

As the ram 31 rises and is withdrawn from the upper side of the anvil 59 the resilience of the spring 58 operates to strip the punch from the opening in the work sheet 50, thereby leaving the latter free to be withdrawn from the gap 34 of the holder and the die and punch which are mounted on the same.

For the purpose of punching holes in sheet metal or other material of a different size the die 40 and the punch 55 may be replaced by other corresponding members adapted for forming holes of either a larger or smaller size. This change is readily effected by withdrawing the punching unit from the head or horn of the holder so as to afford access to the die 40 through the opening 43 and then changing the punching unit and die for others of appropriate sizes.

The die 40 may be readily moved vertically through the opening 43 in the head of the holder because this opening is of larger diameter than this die and its seat 38 in the base of the holder, as shown in Fig. 2, thereby permitting of quickly substituting one die for another when it is desired to punch holes of different diameters.

Due to the fact that the punching unit is capable of floating on the upper head or horn of the holder, the latter is not subjected to any strain but merely serves to hold the punching unit in alignment with the die on the base of the holder so that the punch and die will cooperate properly with each other during the punching operation.

As a means of properly locating the sheet work piece with reference to the punching mechanism a gage or stop 61 is provided which in this instance has the form of a plate arranged along one side of the outer parts of the base and head of the holder and pivoted by a horizontal screw 62 to the base and provided in its upper part with a curved slot 63 which is concentric with the pivot screw 62, and a clamping screw 64 secured to the head of the holder and passing through the slot 63, as shown in Figs. 1 and 2. By loosening the screw 64 and swinging the gage 61 in a vertical plane relative to the holder the inner edge of the gage may be brought to the desired position to serve as a stop which is adapted to be engaged by the edge of the sheet work piece for locating the same relative to the punch and die to permit of producing a hole in the sheet at the proper place. In order to increase the range of adjustment of this gage, the base and head are provided respectively with a plurality of sets of threaded holes 65, 66 which are arranged at different places along the side of the holder and any one set being adapted to receive the pivot and clamping screws 62, 64 for shifting the gage bodily inwardly or outwardly on the holder to suit different requirements.

A plurality of such perforating devices are employed advantageously in producing a plurality of holes simultaneously in sheets of metal or other material without the necessity of making gang or multiple dies and punches for this purpose. In order to enable a plurality of such perforating devices to be used in this manner a templet 67 having preferably the form of a sheet metal plate is supported on the bed 30 of the press and provided with locating or pilot openings 69 with which pilot pins 68 engage. These pilot pins preferably have the form of screws secured to the underside of the base 32 and corresponding in location to the position of the holes 70 which are to be punched in the work piece 50. Each of these pilot pins is fastened into a recess 71 formed in the underside of the base of the punch and die holder in vertical alignment with the die and punch of the respective perforating device and can be screwed into said base so that it does not project below the underside of the base if the holder is to be used at times without a pilot. Each of the punch and die holders is secured to this templet and prevented from becoming displaced thereon either vertically or horizontally by fastening means consisting preferably of a screw 72 passing upwardly through a hole 73 in the templet and into the underside of the base of the punch and die holder, as shown in Figs. 2 and 6, the fastening screws 72 of the several holders being preferably all arranged the same distance from the respective pilot pins 68 for convenience in interchanging the perforating devices in getting out different jobs.

When it is desired to utilize this perforating apparatus for producing a plurality of holes in a sheet of metal or the like the templet sheet 67 is first provided with punch marks or indentations 671, 672 corresponding to the relative position of the holes which are to be produced in the finished product. Then this templet is perforated by any suitable means in accordance with these punch marks or indications to produce the pilot holes 69. Such a templet is shown in Fig. 4 with three holes 69 arranged on straight lines adjacent to opposite front and rear longitudinal edges thereof. In addition thereto fastening holes 73 are formed in the templet adjacent the several pilot holes 69 and at like distances therefrom.

For convenience in punching each pilot opening 69 and its companion fastening opening 73 in the properly spaced relation in the templet plate 67 a preliminary perforating device is provided which may be of any suitable construction, that shown in Fig. 7 as an example being suitable for this purpose and consisting essentially of a holder 81, two punches 80, 801 movable vertically on the upper part of the holder toward and from dies 401 and 402 on the lower part of the holder for producing the holes 69, 73 in the templet 67 which is placed between these dies and their cooperating punches. Each of these dies and companion punch may be organized and operated similar to the die and punch of the perforating mechanism shown in Figs. 2 and 6. The front or inner punch 801 of the templet perforating mechanism is provided at its lower end with a conical point 673 which is first engaged with a correspondingly shaped punch mark 671 formed on the templet sheet 67 where the pilot pin 68 is to be located and then both the front and rear punches 801, 80 are operated to produce the companion holes 69, 73 in the templet for definitely locating the main sheet perforating device on the templet sheet.

A plurality of perforating devices are now attached to the templet in proper position for enabling each perforating device to punch one of the holes 70 in the work piece. This is accomplished by placing the base of each main punch and die holder on the templet and engaging the pilot pin 68 of the holder with pilot hole 69 of the templet 67, and also preferably fastening the respective holder to the templet 67 by means of the screw 72. When the several perforating devices are thus secured in their proper positions to the upper side of the templet they are rigidly connected and form practically a unitary structure which can be slid as a whole over the bed of the press and permit of perforating a sheet by lowering the ram of the press so that the same engages simultaneously with the anvils of the several perforating devices and depresses the several punches so that in cooperation with the several dies a plurality of holes will be formed in the work piece corresponding in position to the location of the pilot pins on the templet due to the axial alinement of each pilot pin with the die and punch of the respective perforating device.

After the perforating devices have been once set up in this manner as many sheets as desired may be punched with holes of the required spacing and as the setting up of the several parts can be effected very rapidly and conveniently the same permits of getting ready for the punching operation at small cost which is important when only a small quantity of articles are to be perforated with a particular arrangement of holes.

The location of the perforating devices is determined by each particular piece of work and distribution of the holes which are to be formed therein and also to permit the operator to readily feed the work piece to the perforating apparatus and remove the same therefrom.

For example, as shown in Fig. 5, five comparatively short holders 74 are employed for supporting the dies and punching devices on the templet in the proper position for punching the holes in the work piece along the rear longitudinal edge and the transverse edges of the same while a comparatively long holder 75 supports the die and punching device from the rear part of the templet for producing the hole 70 along the front longitudinal edge of the sheet, thereby leaving the front part of the perforating mechanism unobstructed for the free introducing of the sheet to be punched and the removal thereof.

To facilitate the positioning of the work sheet in the several perforating devices the gages 61 are so disposed that the appropriate edges of the sheets may be engaged therewith for properly locating the work piece relative to the several dies and punches.

As shown in Fig. 3 the holes 70 in the work piece are of different sizes, but obviously the same may be of different sizes and also varied in the relative location. For example, in Fig. 11, the work piece 50 of sheet material has holes not only along the edges thereof but an additional hole 76 adjacent to the central part of the sheet in accordance with the templet 672 shown in Fig. 12, and in the work piece shown in Fig. 19 the holes 78 are distributed irregularly over the area of this sheet in accordance with the holes 135 in the templet 134 shown in Fig. 20.

If at any time the size of the holes for any particular set-up needs to be changed this can be easily done by replacing the dies and punches of the several perforating devices with others of the desired size without entirely removing the several holders from the templet and thereby preserving the correct relative position of the holes which have been established for a particular job.

In Figures 8, 9 and 10 is shown a form of punching device, templet and gage means which differ somewhat from the corresponding parts in Figs. 1 and 2 but embody the same invention and advantages. As there shown, the punching device is constructed as follows:

The numeral 82 represents a lower bearing disk arranged in the lower part of the guide opening 43 in the head of the holder and provided with a central internally threaded opening which receives the lower end of a tubular guide 83, the upper end of which is provided with a downwardly facing external shoulder 84. In the upper part of this guide opening 43 is arranged an abutment disk 85 which is provided centrally with a downwardly projecting tubular guide neck 86 having an internal upwardly facing shoulder 87 which is adapted to cooperate with the downwardly facing shoulder 84 of the lower guide neck 83 and limit the separation thereof but still permit them to move telescopically one relative to the other. Within the guide opening 43 and surrounding the tubular necks of the upper and lower disks 82 and 83 is a comparatively heavy helical spring 88 which bears with its lower end against the upper side of the lower disk 82 and with its upper end against the under side of the disk 85.

Within the tubular guide necks is arranged a punch 89, the lower end of which is adapted to cooperate with the die 40 for punching a hole in the sheet metal work piece 50 placed for this purpose between this die and punch. The head 90 at the upper end of this punch bears against the upper side of a guide collar 91 which is firmly held against moving in the neck 86 by being tapered to wedge tightly into the cooperating taper in this neck. Above the upper disk 85 is arranged an anvil 92 which bears against the upper end of the punch and is detachably connected with the upper disk preferably by means of an external screw threaded shank 93 engaging an internal thread in the upper disk 85.

The templet 672 in this case is also made of sheet metal and provided with a plurality of locating points which correspond to the position of the holes which are to be punched in the sheets of material, these locating points in this instance consisting of openings 691 formed in the templet 672 which are adapted to receive the necks 94 of pilot screws, each of which is arranged axially in line with the die and punch of one of the perforating devices and is provided at its lower end with a threaded shank 95 engaging with an internally threaded opening at the upper end of the anvil 92 and also with a head 96 which engages with the upper side of the templet 672.

Upon placing a sheet of material 50 into the gaps 34 of the several holders supporting the plurality of perforating devices the lower bearing disk 82 associated with the punch of each of these devices will be raised automatically by reason of the wedging engagement of the sheet material with the curved underside 49 of the respective bearing disk. Owing to the stiffness of the springs 88 of the several perforating units all the parts of the punching devices associated with each of the punches 89 will be raised in their respective guide openings 43 of the holders and also lift the templet 672 which is connected with the upper end of the several punches.

As the ram 31 of the press descends the same engages with the upper ends of the heads 96 forming part of the pilots or locating necks 94 and causes a depression of the several punches 89, together with the templet 672, whereby the punches produce holes in the sheet material 50 in accordance with the locating points which have been previously established on the templet and in accordance with which the several perforating devices have been adjusted relatively to each other by coupling each perforating device with the templet so that its die and punch are axially in line or in register with one of the locating points of this templet.

As each punch 89 descends under the pressure of the ram 31 for producing a perforation in the sheet material 50 the spring 88 is compressed in addition to that which was initially imparted to the same when assembling the parts of the respective punching device, and during this time the lower bearing disk 82 remains at rest upon the sheet material 50 while the upper disk 85 moves downwardly toward the lower disk. Upon raising the ram 31 the several punches 89 are raised by the springs 88 associated therewith so as to strip the punches from the work piece 50 and also raise the templet 672 and the parts associated therewith, preparatory to removing the perforated sheet 50 and replacing the same by another unperforated one.

For the purpose of facilitating the insertion of the sheet material 50 into the gaps 34 of the several perforating devices the base 32 of each holder is extended forwardly or inwardly a sufficient extent beyond the inner end of the companion head 31 so as to form an upward facing guide shelf or ledge 321 on this base in front of the head, as shown in Fig. 2. The edge portion of each sheet which is to be perforated is first rested on the shelves 321 of the several holders and then pushed into the gaps of the same preparatory to operating the punches of the same, thereby enabling the insertion of the sheets into the gaps 34 to be effected easily and conveniently which would not be the case if the base and head of each holder terminated vertically in line with each other.

The periphery 185 of the upper abutment disk 85 is preferably rounded, as shown in Fig. 9, so as to prevent binding of the same in the guide opening 43 and still guide this disk properly.

The modified form of gage or stop which is employed in connection with the construction shown in Figs. 8, 9, 10 consists of a gage block 97 arranged within the outer part of the gap 34 of one or more of the holders of the punching devices in position to be engaged by the adjacent edge portions of the sheet material 50. This gage block is held in position within the gap and is also capable of longitudinal adjustment therein for adapting the same to different requirements by means of a clamping bolt 98 which has its central part passing through the gap 34 and connected with the outer side of the gage black 97 and is provided at one end with a head 99 engaging with one of the longitudinal outer sides of the respective holder and provided at its opposite end with a clamping nut 100 engaging with the opposite longitudinal side of the respective holder, as best shown in Figs. 8 and 9. If desired the upper end of the die 40 may be flush with the top of the base of the holder, as shown in Fig. 9.

In the construction of this invention as shown in Figs. 8, 9, 13 and 14 the templet 672 is only connected with each of the several perforating devices on a line concentric with the die and punch of the respective device and unless some means are employed for holding the holders of these perforating devices against horizontal movement, each of the perforating devices would be liable to swing about the respective die and punch as an axis. Unless the punch and die holder is prevented from swinging horizontally the same will not serve as a support for a gage. In order therefore to permit of utilizing some of the punch and die holders as gage supports without connecting the holders with the templet independently of the pivotal connection between the same in line with the axis of the respective punching device separate retaining means are provided which may be constructed as follows, and shown in Figs. 13, 14, 15 and 16:

Mounted on the upper outer part of some of the holders adjacent to the rear longitudinal side and one of the transverse sides of the templet 672 are clips each of which is preferably of U-shape form and rests with its horizontal web 101 on top of the head 33 of one of the holders, and bears with the depending flange 102 at one end thereof against one longitudinal side of the respective holder, while the opposite depending lug 103 on this web is provided with a clamping screw 104 which bears against the opposite longitudinal side of the respective holder, as best shown in Fig. 15.

Above each clip is arranged a swivel block 105 which is pivotally connected with the adjacent clip by means of a vertically downwardly projecting pivot 106 which turns in an opening in the web 101. As shown in Fig. 13, a clip and swivel block of this character are mounted on the holder of one perforating device arranged along one of the transverse edges of the templet 672 and such clips and swivel blocks are also mounted on two holders of the perforating devices arranged along the rear longitudinal edge of the templet.

The numeral 107 represents a transverse retaining bar arranged along one of the transverse edges of the templet 672 and passing through the swivel 105 of the holder on the respective side of the templet, and 108 is a longitudinal retaining bar arranged along the rear longitudinal edge of the templet and passing through the swivel blocks 105 on two of the holders on the respective side of this templet. These retaining rods are adjustably secured in their respective swivel blocks by means of set screws 109 and the opposing ends of the transverse rod 107 and longitudinal rod 108 are pivotally connected to each other by means of a hinge 110.

By means of the set screws 109 and the pivot pins 106 it is possible to adapt this retaining device to whatever position the holders may occupy relative to the templet 672 and after these parts have been placed in their proper relative position the templet and the holders are rigidly held in this relation by tightening of the set screws 109. This swinging of the gaging unit can also be prevented by keying the punching unit to the holder, as shown in Figs. 23 and 24.

If desired, each of the holders may be provided at its inner end with a plurality of branches, for example two, as shown in Fig. 13 which project laterally in any direction from the main part of the holder and each branch 111, 112 may be provided with a punching unit which is associated with a corresponding die on the companion base of the respective ho'der, whereby corresponding number of holes may be punched in any relative position on the work sheet.

In Figs. 17, 18 and 21 is shown another variation in the construction of the punching device or unit which comes within the scope of this invention and also a variation of the means for mounting the perforating device in the punching press.

The punching device shown in Figs. 17 and 18 is substantially like that shown in Figs. 1 and 2 but differs therefrom as follows:

The bearing disk 113 of the construction shown in Fig. 18 is provided with a flat underside 114. The upper abutment disk 125 is provided with a lower upwardly facing external shoulder 122 and an upper downwardly facing external shoulder 123. A split supporting ring 124 surrounds the contracted central part of the abutment disk 125 and normally rests partly on the lower shoulder 122 and partly on the adjacent upper side of the holder head. Around the upper abutment disk 125 is arranged a lifting spring 119 which is very light as compared with the main stripping spring 126 and engages its lower end with the supporting ring while its upper end engages with the upper shoulder 123 of the abutment disk 125.

The spring 119 is comparatively light and only of sufficient strength to hold the entire punching unit in its elevated position when the press is not in use and thereby retain the underside of the bearing disk 113 flush with or slightly above the underside of the holder head 33 so as to permit of the free introduction and removal of the work sheet 50. The upward movement of the punching unit as a whole at this time is limited by engagement of the lower shoulder 122 of the abutment disk 125 with the underside of the supporting ring 124. During this time the lower and upper disks 113 and 125 are separated fully from each other by means of the heavy stripping spring 126, engaging its opposite ends with the bearing disk 113 and the abutment disk 125. When the ram 31 descends the initial downward movement therewith of the punching unit will cause the light spring 119 to be compressed without, however, affecting the heavy spring 126, but after the bearing disk 113 engages with the upper side of the sheet 50 the continued downward movement of the ram, the anvil 59, the disk 125 and the punch 55 are depressed and the bit 48 of the punch is driven through the sheet metal at which time the heavy spring 126 is also compressed in addition to the heavy tension initially placed therein.

During the initial part of the subsequent upward movement of the ram the heavy spring 126 first separates the abutment disk 125 from the bearing disk 113 and withdraws the punch from the sheet of metal which has been punched. During the next part of the upward movement of the ram the light spring 119 raises the punching unit so that the bearing disk 113 is disengaged from the sheet metal work piece 50 and during the last part of this upward movement the ram moves away from the anvil of this punching unit and into the position shown in Fig. 18.

In the form of this invention shown in Figs. 17, 18 and 19 the holders of the several perforating devices are mounted on the bed or table 30 of the press instead of being connected with the templet, but these holders are adjustable on the bed of the press so that the punch and die of each holder may be located or registered with the point where a perforation is to be produced in a sheet of metal or similar material. The particular means for accomplishing this purpose which are shown in Figs. 17, 18 and 21 comprise a vertical clamping bolt 127 passing through the rear parts of the base and head of each holder and having the head 128 at its lower end engaging with the enlarged lower part of a T-shaped slot or groove 129 in the base 30, and provided at its upper end with a clamping nut 130 engaging with the upper side of the head of the respective holder.

By loosening the nut 130 the bolt 127 together with the perforating device associated therewith may be moved lengthwise of the bed 30 and also turned horizontally into the desired angular position for bringing its punch and die into the proper location for punching a sheet of metal 50 in accordance with the predetermined order.

The bed may have a number of slots 129 so that if desired holders mounted thereon may extend from the sides of the sheet inwardly, one such additional slot being shown in Figs. 17 and 18.

In order to leave the front of the press clear for the introduction and removal of the sheet of metal which is be to be punched the adjusting slots 129 are arranged lengthwise along the rear part of the bed 30 and all the holders of the several perforating devices are mounted in these slots and project forwardly from the bed over the place where the sheet to be punched is located, as shown in Fig. 21.

If desired the rear gage, as shown in Figs. 17, 18, and 21, may be made in the form of a disk 200 which presents a straight face 201 to the edge of the work sheet 50 and is adjustably secured to one side of the holder by a bolt 199 passing through the gap 34 of the holder. This gage disk 200 is held against turning so that it always presents the straight gage face 201 to the sheet to be registered, this being preferably accomplished by a key 301 arranged on the inner side of the gage disk 200 and projecting into the gap 34 between the base and head of the holder, as shown by dotted lines in Figs. 17 and 18.

The side gage 131 shown in Fig. 21 consists of an upright pin which is adapted to be engaged by one of the transverse edges of the work piece and mounted on a forwardly projecting arm 132 which is connected with the base 30 by means of a clamping bolt 133 engaging with the adjacent part of the T-shaped slot 129 similar to the connection between the bolt 127 and the bed 30, as shown in Fig. 18.

For the purpose of properly locating the perforating devices shown in Figs. 17, 18 and 21 with reference to each other so as to bring the dies and punches of the same into the proper position for punching the holes in the sheets in accordance with the predetermined order, a templet 134 shown in Fig. 20 is employed which is provided with a plurality of pilot perforations 135 corresponding to the location of the holes which are to be formed in the sheets of metal which are to be perforated. These pilot perforations may be all the same size to take a standard pilot pin 137 or the size of the holes to be punched.

In using this templet 134 the same is introduced into the gaps 34 of the several holders and the punch devices of the several holders are removed from the heads of the holders and replaced by locating plugs 136, each of which is provided at its lower end with a pilot or locating pin 137 which is engaged with one of the locating or pilot holes 135 of the templet, as shown in Fig. 22. After the holders of the several perforating devices have been thus definitely located by the templet 134 and the locating pins 137 of the several locating plugs, the holders are fastened in position on the bed of the press by tightening the bolts 127 after which the gauges or stops are set against the edges of the templet and clamped in position by the bolts 199. After this the locating plugs 136 of these several holders are removed from the heads thereof and replaced by the punching units thereby putting the perforating apparatus in condition for perforating sheets with the holes arranged relatively to each other in accordance with the position which has been determined by the templet 134.

If desired the punch and die may be formed to produce a hole other than round in cross section. For example, as shown in Figs. 23 and 24, the punch 138 may be square in cross section and as shown in Fig. 25 the die 139 may be provided with a square opening 140 for cooperation with the punch to produce a square hole in the sheet work piece. When the punch is not round means are provided for maintaining the same in correct register with the opening of the companion die and this is preferably accomplished by making the bore 141 of the lower tubular guide neck 142 square in cross section to fit the square punch 138 which slides therein, also holding this neck against turning in the lower bearing disk 143 by peening the lower threaded end of this neck against the underside of the bearing disk, as shown at 144, and also holding the lower bearing disk against turning on the head 33, by providing the latter with a spline 145 which engages with a longitudinal groove 146 in the lower bearing disk 143.

It will be now apparent that in each of the several means for locating the perforating devices relatively to each other a templet is employed which definitely locates the several holders relatively to each other so that the die and punch of each holder registers with one of the places where a hole is to be punched in a sheet. The use of these perforating devices in the manner described permits of expeditiously perforating sheets of material in which the holes are arranged in various relative positions and also of different sizes without necessitating the making of special dies and punches for this purpose, thereby effecting a considerable economy especially when only a small quantity of sheets are to be punched with a plurality of holes arranged in definite relative positions.

I claim as my invention:

1. A sheet material perforating apparatus for use between the bed and ram of a press, comprising a holder having a lower base and an upper head, a perforating die mounted on said base, and a punching device mounted and guided on said head as a punching unit, which unit is capable of being freely assembled with said head and removed therefrom and is also capable of floating freely on said head and including a punch cooperating with said die, and a spring stripping means for withdrawing the punch from said sheet.

2. A sheet material perforating apparatus for use between the bed and ram of a press, comprising a holder having a base and head, a perforating die mounted on the base, and a punching device removably mounted as a unit on said head and including a lower bearing disk, a tubular neck projecting upwardly from said bearing disk, an upper abutment disk slidably connected with the upper end of said neck, a spring interposed between said lower and upper disks, and a punch arranged lengthwise in said neck and having an anvil at its upper end engaging with said abutment disk.

3. A sheet material perforating apparatus for use between the bed and ram of a press, comprising a holder having a base and head, a perforating die mounted on the base, and a punching device removably mounted as a unit on said head and including a lower bearing disk, a tubular neck projecting upwardly from said bearing disk, an upper abutment disk slidably connected with the upper end of said neck, a spring interposed between said lower and upper disks, and a punch arranged lengthwise in said neck and having an anvil at its upper end engaging with said abutment disk, said neck being provided with a downwardly facing shoulder adapted to engage with an upwardly facing shoulder on said abutment disk.

4. A sheet material perforating apparatus for use between the bed and ram of a press, comprising a holder having a base and head, a perforating die mounted on the base, and a punching device removably mounted as a unit on said head and including a lower bearing disk, a tubular neck projecting upwardly from said bearing disk, an upper abutment disk slidably connected with the upper end of said neck, a spring interposed between said lower and upper disks, and a punch arranged lengthwise in said neck and having an anvil at its upper end engaging with said abutment disk, said neck being provided with a downwardly facing shoulder adapted to engage with an upwardly facing shoulder on said abutment disk, and said neck also having a screw connection with said bearing disk.

5. A sheet material perforating apparatus for use between the bed and ram of a press, comprising a holder having a lower base and an upper head, a perforating die mounted on said base, and a punching device slidable vertically as a unit on said head and including a bearing member having an inclined lower face adapted to be engaged by said sheet upon pushing the latter between said bearing member and the base and thus automatically raising said unit, a punch slidable in said bearing member, and a spring for yieldingly holding said punch in a raised position relative to said bearing member.

6. A sheet material perforating apparatus for use between the bed and ram of a press, comprising a holder having a lower base and an upper head, a perforating die mounted on said base, and a punching device mounted on said head and including a lower bearing disk slidable vertically on said head and adapted to be engaged by said sheet and having an upwardly projecting tubular neck, an upper abutment disk slidable vertically on said head and having a downwardly projecting tubular neck, said necks being telescoped and having cooperating shoulders for limiting the separation of said lower and upper disks, spring means arranged between said lower and upper disks, a punch arranged in said necks and adapted to cooperate with said die, and an anvil member secured to said upper abutment disk and engaging with said punch and adapted to be engaged by the ram of the press.

7. A sheet material perforating apparatus for use between the bed and ram of a press, comprising a holder having a lower base and an upper head, a perforating die mounted on said base, and a punching device mounted on said head and including a lower bearing disk slidable vertically on said head and adapted to be engaged by said sheet and having an upwardly projecting tubular neck, an upper abutment disk slidable vertically on said head and having a downwardly projecting tubular neck, said necks being telescoped and having cooperating shoulders for limiting the separation of said lower and upper disks, spring means arranged between said upper and lower disks, a punch arranged in said necks and adapted to cooperate with said die, an anvil member secured to said upper abutment disk and engaging with said punch and adapted to be engaged by the ram of the press, and a guide collar rigidly held in the neck of said upper disk and having an upwardly facing shoulder engaging with a downwardly facing shoulder on said punch.

8. A sheet material perforating apparatus for use between the bed and ram of a press, comprising a holder having a base and head, a perforating die mounted on the base, and a punching device removably mounted as a unit on said head and including a lower bearing disk, a tubular neck projecting upwardly from said bearing disk, an upper abutment disk slidably connected with the upper end of said neck, a heavy spring interposed between said disks, said upper disk having upper and lower external shoulders, a split supporting ring adapted to engage said lower shoulder and the upper side of the holder head, and a light spring interposed between said supporting ring and said upper shoulder.

9. A sheet material perforating apparatus for use between the bed and ram of a press, comprising a holder having a base and head, a perforating die mounted on the base, and a punching device mounted on said head as a unit which is independent of the head and capable of being freely assembled therewith and removed therefrom and to freely float in said head and including a lower bearing disk, a tubular neck projecting upwardly from said bearing disk, an upper abutment disk slidably connected with the upper end of said neck, a heavy spring interposed between said disks, and a light spring interposed between said holder and upper disk and adapted to hold the punching unit normally in its elevated position.

10. A sheet material perforating apparatus for use between the bed and ram of a press, comprising a holder having a lower base and an upper head, a perforating die mounted on said base, a punching device mounted on said head and including a punch adapted to cooperate with said die and a stripping device for separating said punch from said sheet and die, and means for connecting each holder with the bed of the press and permitting universal adjustment of said holder in a horizontal plane between said bed and ram.

11. A sheet material perforating apparatus for use between the bed and ram of a press, comprising a holder having a lower base and an upper head, a perforating die mounted on said base, a punching device mounted on said head and including a punch adapted to cooperate with said die and a stripping device for separating said punch from said sheet metal and die, and means for connecting each holder with the bed of the press and permitting universal adjustment of said holder in a horizontal plane between said bed and ram, comprising a clamping bolt passing through said holder and adapted to engage its head with a T-shaped groove in the bed and provided with a nut engaging with the top of the holder.

12. A sheet material perforating apparatus for use between the bed and ram of a press, comprising a plurality of perforating devices adapted to rest on said bed, and each constituting a complete unit independent of the bed and ram and having a holder, a lower die and an upper punch cooperating with the respective die, a templet connected with each holder in line with the axis of the respective die and punch thereof, and means for retaining the several holders in a definite position relatively to each other and gaging the sheet to be perforated, said templet and the several perforating units connected therewith being freely movable horizontally in all directions in the space between the bed and ram of the press.

13. A sheet material perforating apparatus for use between the bed and ram of a press, comprising a plurality of holders adapted to rest on said bed, and each having a lower die and an upper punch cooperating with the respective die, a templet connected with each holder in line with the axis of the respective die and punch thereof, and means for retaining the several holders in a definite position relatively to each other and gaging the sheet to be perforated, comprising clips secured to said holders, swivel blocks pivoted on said clips, retaining rods passing through different swivel blocks and adjustably secured thereto, and means for pivotally connecting said retaining rods.

14. A sheet material perforating apparatus for use between the bed and ram of a press, comprising a plurality of perforating devices, each of which constitutes a complete unit independent of the bed and ram and comprises a holder, a die and a punch cooperating with the respective die, and a templet for definitely locating the several holders relatively to each other so that the die and punch of each holder register with one of the places where a hole is to be punched in a sheet, said templet and the several perforating units connected therewith being freely movable horizontally in all directions in the space between the bed and ram of the press.

15. A sheet material perforating apparatus for use between the bed and ram of a press, comprising a plurality of perforating devices each of which constitutes a complete unit independent of the bed and ram and comprises a holder, a die and a punch cooperating with the respective die, and a templet for definitely locating the several holders relatively to each other so that the die and punch of each holder register with one of the places where a hole is to be punched in a sheet, said templet being secured to the underside of the several holders and provided with a plurality of pilot openings each of which receives a pilot pin arranged on the underside of each holder in line with the die and punch thereof, said templet and the several perforating units connected therewith being freely movable horizontally in all directions in the space between the bed and ram of the press.

16. A sheet material perforating apparatus for use between the bed and ram of a press, comprising a plurality of perforating devices, each of which constitutes a complete unit independent of the bed and ram and comprises a holder, a die and a punch cooperating with the respective die, and a templet for definitely locating the several holders relatively to each other so that the die and punch of each holder register with one of the places where a hole is to be punched in a sheet, said templet being operatively connected with the upper end of each punch in line with the axis thereof, said templet and the several perforating units connected therewith being freely movable horizontally in all directions in the space between the bed and ram of the press.

17. A sheet material perforating apparatus for use between the bed and ram of a press, comprising a plurality of holders each of which is provided with a die and a punch cooperating with the respective die, and a templet for definitely locating the several holders relatively to each other so that the die and punch of each holder registers with one of the places where a hole is to be punched in a sheet, said templet being insertable between the die and punch of the several holders and provided with openings adapted to be engaged by pilot pins which are temporarily substituted for one of the perforating elements of the several holders.

18. The herein described method of perforating sheets of material by a plurality of perforating devices each of which is a complete unit independent of other like units and has a die and a punch cooperating with the die, said method consisting in providing a templet with a plurality of locating points corresponding to the relative position of the several holes which are to be formed in the sheets of material, arranging said perforating devices so that the die and punch of each of said devices are in register with one of the locating points of said templet, and then operating on said sheets of material by said perforating devices and producing holes therein in accordance with the locating points of said templet, said templet and the several perforating units connected therewith being freely movable horizontally in all directions in the space between the bed and ram of the press.

19. A sheet material perforating apparatus comprising a frame having a base provided with a socket and a head arranged above said base, and provided with a guideway in line with said socket, a die removably arranged in said socket, supporting means removably arranged in said guideway and having its lower part provided with an inclined edge and adapted to rest solely by gravity either on said die or on the sheet to be perforated, and said inclined edge adapted to be engaged by said sheet upon inserting the latter between the die and said supporting means, so that the latter is raised automatically by the sheet, and a punch slidable in said support and adapted to cooperate with said die.

20. A sheet material perforating apparatus comprising a frame provided in its lower part with a socket and in its upper part with a guideway which is in line with said socket, a die arranged in said socket, and a punching device comprising a carrier movable in said guideway, a punch movably mounted in said carrier, and resilient stripping means mounted on said carrier and operating to hold said punch normally in an elevated position with reference to said carrier, said resilient stripping means being constantly under an initial tension and adapted to be further strained upon moving the punch relative to the carrier and operating to automatically withdraw the punch from the article to be perforated, and said carrier punch and resilient stripping means being organized as a complete unit which is operative independently of said frame and capable of being freely assembled therewith and removed therefrom and to float freely on said frame.

21. A sheet material perforating apparatus for use between the bed and ram of a press, comprising a holder having a lower base and an upper head, and a perforating device mounted on said base and head and adapted to form holes in a sheet placed between said base and head upon moving said bed and ram one relatively to the other, said perforating device comprising a lower die seated in a socket in said base, and a punching unit slidable vertically in a guide opening in said head and having a punch adapted to cooperate with said die, said guide opening being axiallly in line with and of larger diameter than said die and socket.

GEORGE F. WALES.